US009276765B2

(12) United States Patent
Monroe et al.

(10) Patent No.: US 9,276,765 B2
(45) Date of Patent: Mar. 1, 2016

(54) APPARATUS AND SYSTEM FOR AN ACTIVE STAR/STUB/RING CONTROLLER AREA NETWORK PHYSICAL LAYER TRANSCEIVER

(75) Inventors: Scott Allen Monroe, Frisco, TX (US); David Wayne Stout, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1143 days.

(21) Appl. No.: 13/295,256

(22) Filed: Nov. 14, 2011

(65) Prior Publication Data

US 2013/0094353 A1 Apr. 18, 2013

Related U.S. Application Data

(60) Provisional application No. 61/546,668, filed on Oct. 13, 2011.

(51) Int. Cl.
*H04L 12/413* (2006.01)
*H04L 12/40* (2006.01)

(52) U.S. Cl.
CPC ... *H04L 12/4135* (2013.01); *H04L 2012/40215* (2013.01)

(58) Field of Classification Search
CPC ......... H04L 25/08; H04L 12/12; H04L 12/26; H04L 12/2602; H04L 12/4135
See application file for complete search history.

(56) References Cited

U.S. PATENT DOCUMENTS

| 5,734,658 | A | 3/1998 | Rall et al. | |
|---|---|---|---|---|
| 6,034,995 | A * | 3/2000 | Eisele et al. | 375/257 |
| 6,405,330 | B1 * | 6/2002 | Hanf et al. | 714/712 |
| 7,884,744 | B2 * | 2/2011 | De Haas et al. | 341/110 |
| 2004/0124905 | A1 * | 7/2004 | Haase et al. | 327/437 |
| 2004/0158781 | A1 * | 8/2004 | Pihet | 714/712 |
| 2006/0170451 | A1 * | 8/2006 | Jordanger et al. | 326/34 |
| 2008/0276107 | A1 * | 11/2008 | Bogavac | 713/323 |

OTHER PUBLICATIONS

Pat Richards, A CAN Physical Layer Discussion, AN228, Microchip Technology Inc., 2002, DS00228A, pp. 1-12.
Sudhish Kumar, An Introduction to CAN, Control Area Network (CAN) Tutorial-ElectroSofts.com, Nov. 15, 2011, pp. 1-7.

* cited by examiner

*Primary Examiner* — Alvin Zhu
*Assistant Examiner* — Bo Hui A Zhu
(74) *Attorney, Agent, or Firm* — Andy Viger; Frank D. Cimino

(57) ABSTRACT

A controller area network (CAN) node comprises an internal high differential bus line (CANH) and an internal low differential bus line (CANL). The CAN node further comprises a receiver (RXD) comparator coupled to both the internal CANH and the internal CANL that outputs an internal RXD signal. The CAN node further comprises an RXD dominant time out (DTO) circuit. The RXD DTO circuit includes: a) an RXD dominant transition detector coupled to an output of the RXD comparator; b) a timer triggered by the RXD dominant transition detector detecting a dominant RXD transition; c) an RXD dominant timer comparator that is coupled to an output of the timer which compares an output of the timer to a selected value; d) an internal RXD dominant signal is changed to an RXD DTO recessive signal after a selected time interval has lapsed and can include a fault output to signal this fault condition.

12 Claims, 8 Drawing Sheets

APPARATUS AND SYSTEM FOR AN ACTIVE STAR/STUB/RING CONTROLLER AREA NETWORK PHYSICAL LAYER TRANSCEIVER

RELATED APPLICATIONS

This Application claims priority from a provisional application, "Apparatus and System for an Active Star/Stub Controller Area Network Physical Layer Transceiver", Ser. No. 61/546,668, filed on Oct. 13, 2011.

TECHNICAL FIELD

This Application is directed, in general, to controller area networks (CANs), and, more specifically, to a prevention and detection of a blocking fault of a star line, stub line, or ring of a CAN network.

BACKGROUND

Turning to FIG. 1, a CAN includes a differential bus having a CAN high differential bus line (CANH) and a CAN low differential bus line (CANL). These bus lines have two states: a "recessive" state, and a "dominant" state, which is determined by a voltage differential between the CANH and CANL. The CANH and the CANL are driven by a transmission driver circuit.

A "recessive" state is defined as a "logic high" and the voltage differential between CANH and CANL is equal to or less than 0.5 volts. The median voltage of CANH and CANL may be "weakly" biased to Vcc/2. A "dominant" state is a "logic low", the voltage differential between CANH and CANL is greater than or equal to 0.9 volts.

In CAN arbitration, a plurality of CAN nodes can contend for a shared differential bus simultaneously. In CAN networks, a dominant value from a first CAN node (i.e. a value of "logic low" or "zero" as represented by a voltage differential greater than 0.9 volts) overwrites a recessive value from a second CAN node (i.e. a value of zero as represented by a voltage differential greater than 0.9 volts). The CAN network will therefore convey the dominant value across CAN network through its differential bus lines. For an additional discussion of CANs, please see International Standards Organization (ISO) standard ISO-11898.

Principles of CAN operation are further illustrated in FIG. 2. In FIG. 2, a first CAN node having a driver output 205, a second CAN node having a driver output 210, and a third CAN node having a driver output 215, are all transmitting simultaneously when contending for dominant arbitration. As is illustrated, a second CAN node driver output 210 wins the arbitration as it has the highest priority address, i.e., the most number of dominant bits (zeroes) in a row. A CAN bus signal 220, can then be illustrated as the voltage differential when measured across the CAN voltage differential bus, as any CAN node driving dominant overwrites a recessive on its shared CAN bus. In other words, the CAN bus physical design combines signals equivalent to a logical AND.

A receiver dominant (RXD) signal 225 of the various CAN nodes illustrates an ANDed signal as a result of signals that would be generated by each CAN node of FIG. 2. Generally, an RXD signal is derived by each CAN node from the CAN bus differential voltage for each node. Generally, an RXD dominant signal indicates whether a CAN node is measuring a dominant state across its CANH and CANL. The CAN node then compares the received state to the TXD (driven) state to determine arbitration across its CANH and CANL. This signal is received by all CAN nodes on the bus. Taking two times the total loop time into account the first CAN node to the last CAN node will indicate that a dominant bus signal has been driven by any CAN node in the network and measured by all CAN nodes in the network.

FIG. 3A illustrates a high-level illustration of an RXD receiver 300. Each prior art CAN node on a CAN network may include the RXD receiver 300. As illustrated, a differential comparator 310 compares a voltage differential between a CANH and a CANL. If the voltage differential is at or below a first value, such as 0.5 volts, a recessive RXD value is generated (a logical "high"; if the voltage differential is equal to or above a second value, such as 0.9 volts, a dominant RXD value is generated (a logical "low"). The thresholds are set internally to differential comparator 310. The Vcc/2 320 sets the common mode voltage of differential comparator 310.

FIG. 3B is a high-level illustration of a transmission dominant driver (TXD) 350. A TXD amplifier 360 receives a TXD signal and will therefore either turn on or off a first field effect transistor (FET) 363 and a second FET 366, thereby generating either: a) a dominant voltage differential between CANH and CANL (e.g., greater than or equal to 0.9 volts) or b) a recessive voltage differential between CANH and CANL (e.g., lesser than or equal to 0.5 volts.) An RXD signal is conveyed over an RXD pin which will follow TXD pin during data transmission. TXD is typically an output from the CAN controller to the driver.

However, there are certain problems associated with CANs. CAN bus topology does not always work in all environments, due to various physical constraints and the network can be blocked by "stuck dominant" faults. The physical constraints do not typically create the dominant faults, but the physical constraints make the network blocked when a fault occurs. These problems can include limited flexibility in topologies due to various transmission line principles of bus topology. Indeed, bus topology does not always suit the physical requirements for the network. For example, an airplane can have a central CAN node in the cockpit, with equal distance for CAN nodes to each wing but a different distance to the tail. This can create significant problems with reflections, etc. in CAN topologies. Moreover, there may be limited wiring available for a given physical infrastructure. Furthermore, it can be problematic to build a redundant physical topology, especially a ring network.

Indeed, "bus stuck dominant faults" (i.e., when a bus line of the CAN network stays stuck in "dominant") can block an entire CAN system, since "dominant" overwrites "recessive" in CAN differential busses. Therefore, it can be, at best, problematic to have alternative or redundant topologies with robustness to branches of the network with a bus stuck dominant fault. Moreover, different branches of a CAN network can have different resistances, which can be problematic for noise and bus stuck dominant faults.

Indeed, U.S. Pat. No. 5,734,658 to Rall et al is generally directed towards using non-standard termination resistances at a center of a star and on each ray or stub line of a CAN network to allow for non-standard CAN bus line resistances. However, this topology is known to have severe issues with signal integrity due to the non-standard scheme and multi-stub topology.

Therefore, there is a need in the art to address at least some of the issues associated with CAN networks.

SUMMARY

A first aspect provides a controller area network (CAN) that comprises an internal high differential bus line (CANH)

and an internal low differential bus line (CANL). The CAN node further comprises a receiver (RXD) comparator coupled to both the internal CANH and the internal CANL that outputs an internal RXD signal. The CAN node further comprises an RXD dominant time out (DTO) circuit. The RXD DTO circuit includes: a) an RXD dominant transition detector coupled to an output of the RXD comparator; b) a timer that is triggered by the RXD dominant transition detector detecting a dominant RXD transition; and c) an RXD dominant timer comparator that is coupled to an output of the timer which compares an output of the timer to a selected value. An internal RXD dominant signal is changed to an RXD DTO recessive signal after a selected time interval has lapsed as measured by the RXD dominant timer comparator.

A second aspect provides a system of a plurality of coupled controller area network (CAN) nodes, comprising: a) a first CAN node, including: i) a first coupled high differential bus line (CANH); ii) a second coupled low differential bus line (CANL); iii) a first receiver (RXD) comparator coupled to both the first coupled CANH and the first coupled CANL that outputs a first internal RXD signal; and iv) a first RXD dominant time out (DTO) circuit that changes a first internal RXD dominant signal to a first RXD DTO recessive signal after a first selected time interval has lapsed as measured by the first RXD DTO circuit;

The second aspect further provides b) a second CAN node, including: i) a second CANH coupled to the second CAN node; ii) a second CANL coupled to the second CAN node; iii) a second RXD comparator coupled to both the second coupled CANH and the second coupled CANL that outputs a second internal RXD signal; and iv) a second RXD DTO circuit that changes a second internal RXD dominant signal to a second RXD DTO recessive signal after a second selected time interval has lapsed as measured by the second RXD DTO circuit. A logical combiner of a signal derived from first RXD DTO signal and the second RXD DTO signal creates an RXD combined signal.

In a third aspect, a system of a plurality of coupled controller area network (CAN) nodes is provided. This third aspect comprises a first node having a plurality of layers; a first physical layer having: i) a first coupled high differential bus line (CANH); ii) a first coupled low differential bus line (CANL); iii) a first receiver dominant (RXD) comparator coupled to both the first coupled CANH and the first coupled CANL that outputs a first internal RXD signal; and iv) a first RXD dominant time out (DTO) circuit that changes a first internal RXD dominant signal to a first RXD DTO recessive signal after a first selected time interval has lapsed as measured by the first RXD DTO circuit.

In the third aspect, a second physical layer has: i) a second coupled CANH; ii) a second coupled CANL; iii) a second RXD comparator coupled to both the second coupled CANH and the second coupled CANL that outputs a second internal RXD signal; and iv) a second RXD DTO circuit that changes a second intermediate RXD dominant signal to a second intermediate RXD recessive signal after a second selected time interval has lapsed as measured by the second RXD DTO circuit. A logical combiner of the first intermediate RXD signal and the second intermediate RXD signal to create a combined RXD signal; and a first physical layer of the first CAN node is coupled to a third physical layer of the second CAN node.

BRIEF DESCRIPTION OF THE DRAWINGS

Reference is now made to the following descriptions.

DETAILED DESCRIPTION

Figure 1:
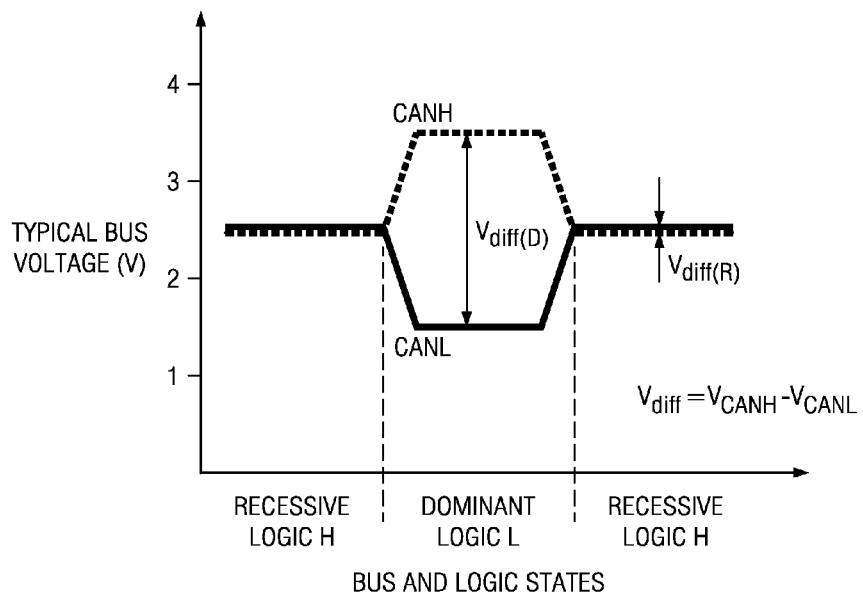
FIG. 1 illustrates an example of a prior art CAN bus voltages.
Figure 3A:
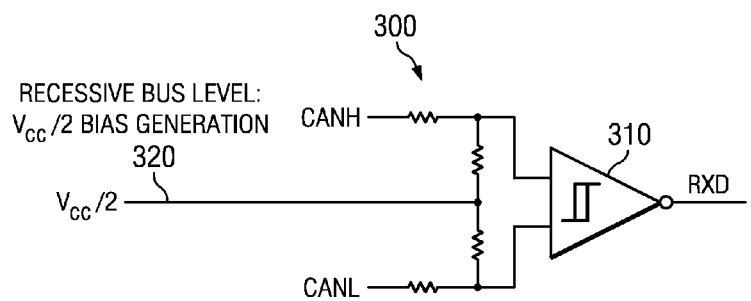
FIG. 3A is an example of a prior art receiver in a CAN network.
Figure 3B:
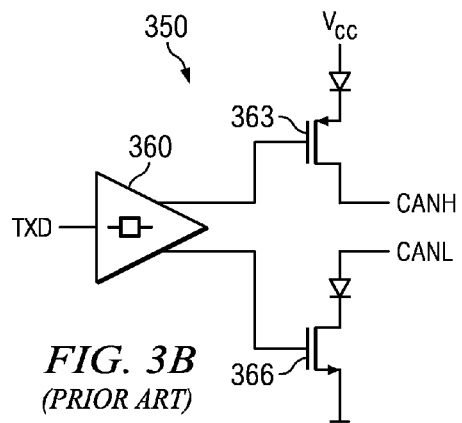
FIG. 3B is an example of a prior art transmit dominant driver.
Figure 2:
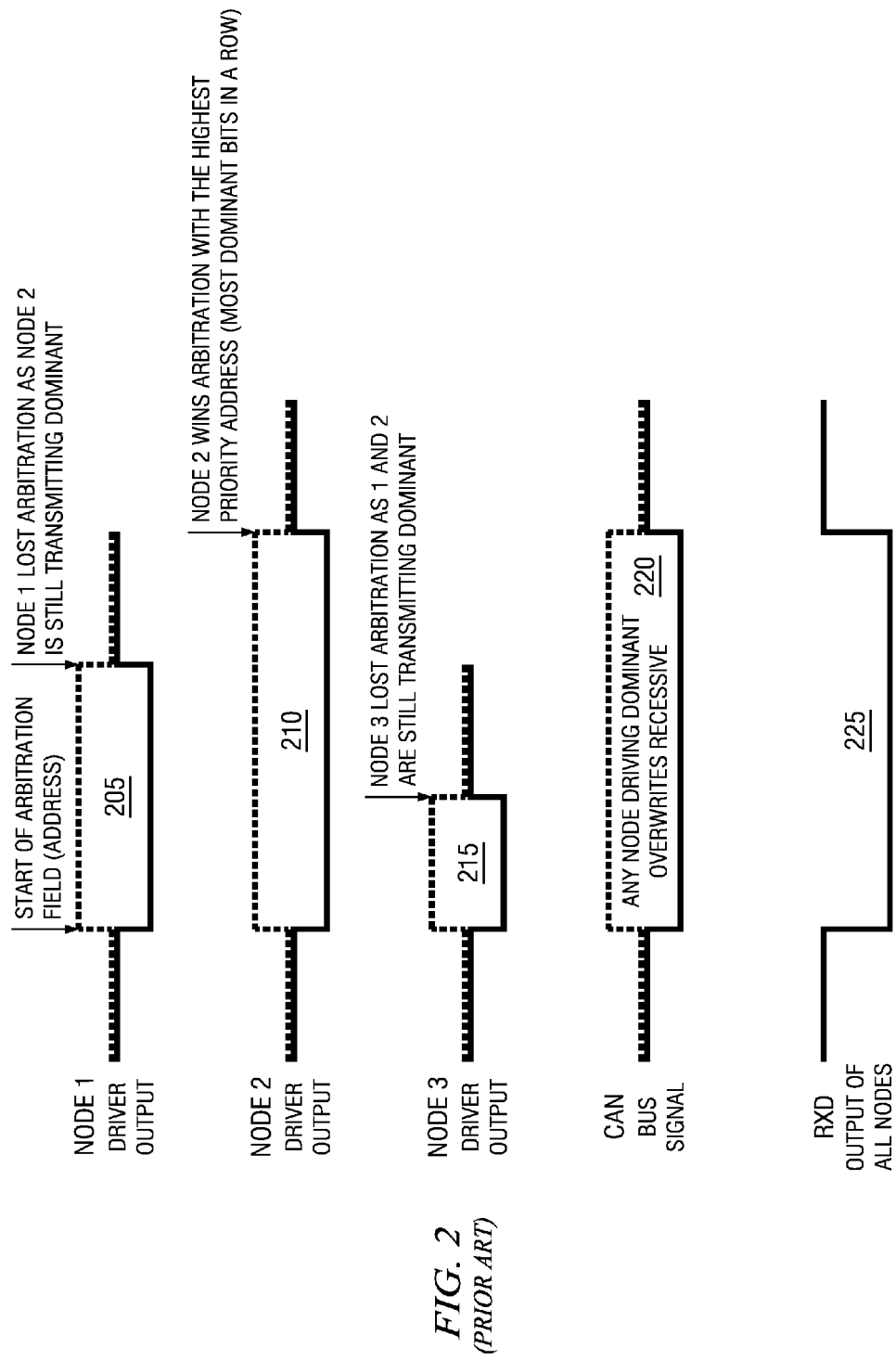
FIG. 2 illustrates an example of a prior art CAN bus arbitration.
Figure 4:
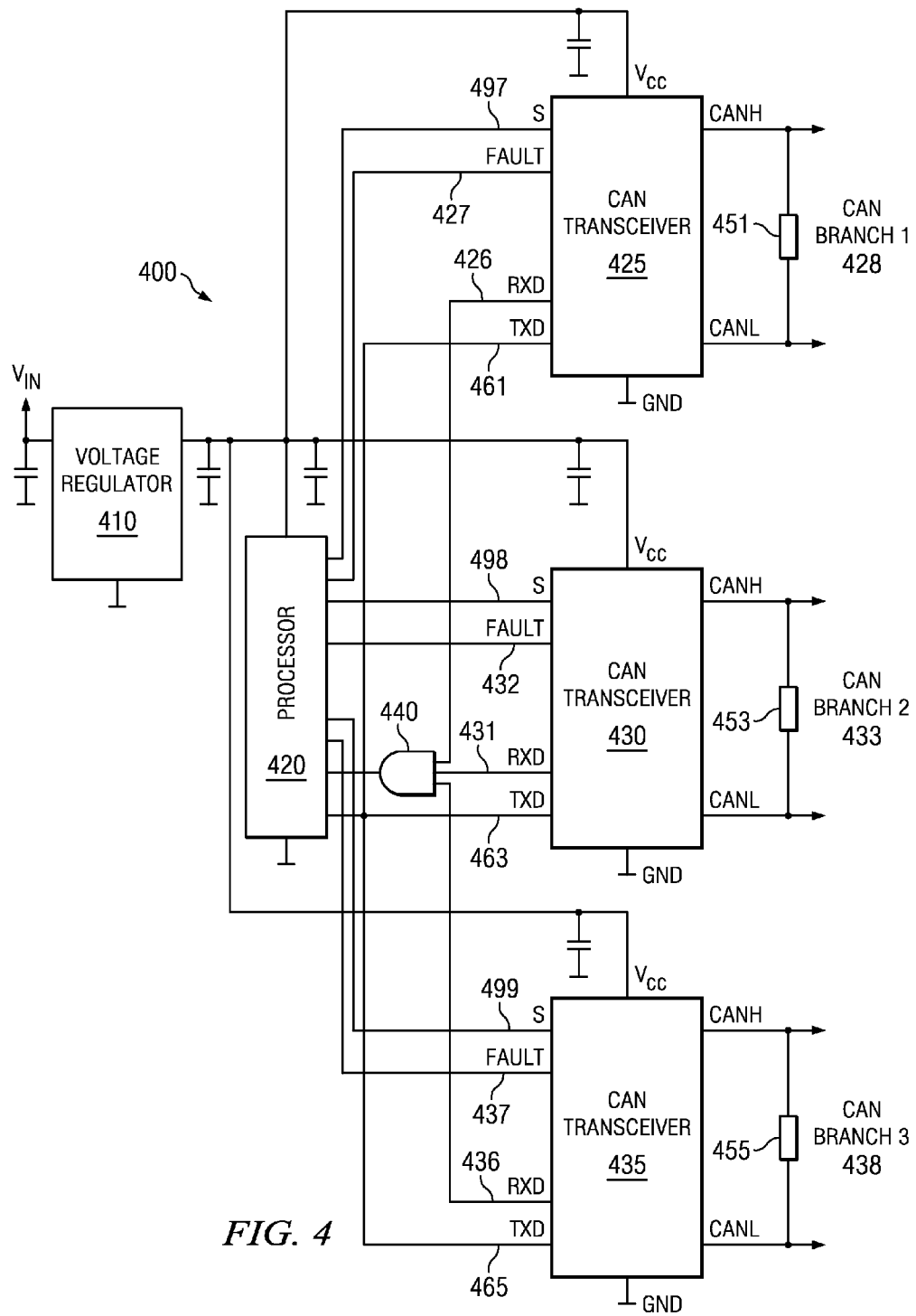
FIG. 4 is an example of master CAN node bus employing RXD dominant time out (DTO) circuitry.

Turning to FIG. 4, illustrated is one embodiment of a CAN system 400 constructed according to the principles of the present Application. In the CAN system 400, a voltage regulator 410 is coupled to a processor 420, a designation which can designate a microcontroller (MCU), digital signal processor (DSP), microprocessor (pP) or other processor, to apply Vcc to processor 420. The voltage regulator 410 is also coupled to a first CAN node 425, a second CAN node 430, and a third CAN node 435, also to apply Vcc. In this Detailed Description, all CAN nodes are to be deemed CAN transceiver nodes unless otherwise noted.

The first CAN node 425, the second CAN node 430, and the third CAN node 435, each has their own coupled CANH and CANL external lines bus lines, and the CAN nodes 425, 430, 435 are assigned to a first CAN branch 428, a second CAN branch 433, and a third CAN branch 438, respectively. The first CAN branch 428, the second CAN branch 433, and the third CAN branch 438 can have different resistances specific to that branch of the total CAN network. These branches are now isolated from each other via the CAN transceivers and become properly terminated transmission lines, as contrasted to variable combinations of transmission lines and resistances all tied to a single point, as in the prior art of Rall.

For example, the prior art system of Rall has the disadvantage with respect to termination in that the termination needs to be recalculated and reconfigured for any change in system configuration, effectively no matter how major or minor. In the system 400, however, each branch 428, 433, 438 can be configured in any implementable fashion as long as the ends of a physical cable are terminated with resistors which match the characteristic impedance of the physical cable.

The first CAN node 425, the second CAN node 430, and the third CAN node 435 measure the voltage differentials across their respective branches, and report indicia corresponding to the various results of these measurements to processor 420, as will be explained in more detail below. Moreover, the first CAN node 425, the second CAN node 430, and the third CAN node 435 drive their respective CAN branches to dominant or recessive as directed by processor 420 through reception of a TXD signal over a TXD line 461, 463, and 465, respectively, which was derived by processor 420 through employment of RXD values.

To properly terminate each CAN branch termination resistors are used. The first CAN node 425 has a resistor 451, which is in turn coupled between the CANH and CANL of its CAN node 425. Similarly, the second CAN node 430 has a resistor 453 coupled between its CANH and CANL, and the third CAN node 435 has a resistor 455 coupled between its CANH and CANL. The first CAN node 425, the second CAN node 430, and the third CAN node 435 use voltages measured across their CANH and CANL inputs, to determine whether a receive dominant or a receive recessive situation is occurring across its respective CAN branch. From these determinations, the RXD values for RXD are generated by each CAN transceiver node.

A logical combiner 440, such as an AND gate, then receives a first intermediate RXD signal 426 from the first CAN node 425, receives a second intermediate RXD signal 431 from the second CAN node 430, and a third intermediate RXD signal 436 from the third CAN node 436, after each CAN node determines whether the receive dominant or receive recessive situation is occurring on its respective CAN branch, as discussed above. A resulting logical combination is then forwarded as RXD combined to the coupled processor 420 as an RXD combined signal.

A first fault signal line 427 couples the first CAN node 425 to processor 420, a second fault signal line 432 couples the second CAN node 430 to processor 420, and a third fault signal line 437 couples the third fault CAN node 435 to processor 420. The conditions for determining the fault condition will be explained below.

A first silent signal line 497 couples processor 420 to the first CAN node 425, a second silent signal line 498 couples processor 420 to the second CAN node 430, and a third silent signal line 499 couples processor 420 to the third CAN node 435. The conditions for employing the silent signals will be explained below.

Processor 420 employs the RXD combined signal value to determine whether to apply a TXD dominant or TXD recessive signal to all coupled CAN nodes, which enables them all to start contending for arbitration should they decide to do so, or whether to apply a TXD recessive, which puts all the CAN nodes (the first CAN node 425, the second CAN node 430, and the third CAN node 435) into a recessive (non-contending) state.

Regarding the RXD signal, each CAN node (the first CAN 425, the second CAN node 430, and the third CAN node 435) has the ability to detect an error state, an erroneous "dominant" through measurement of a time since a transition to a dominant state has occurred on its own respective CAN branch.

If a branch, such as a CAN branch 428, is dominant, an intermediate RXD dominant signal is generated by its respective CAN node and is output to the logical combiner 440. However, if a dominant state is detected for more than a given time period, an RXD dominant time out (DTO) circuit within a given CAN node overrides the intermediate RXD dominant output, and instead outputs an intermediate RXD recessive signal to the logical combiner 440, as this may indicate a possible fault condition for a given CAN node, such as shall be discussed in FIG. 9 and FIG. 10, below.

In other words, in the system 400, if a sufficient time lapse has occurred since a transition to a "dominant" state for a given CAN branch, a "dominant" branch error condition does not "freeze" a CAN network, such as the network 400. Instead, a CAN node detects a bus dominant error, such as a short, and will put the RXD intermediate signal into recessive (logic "H") to allow the other branches' RXD intermediate signals not to be over-ridden when conveyed to processor 420 via the logical combiner 440 as the RXD combined signal.

In a further embodiment, each of the first fault line 427, second fault line 432, and the third fault line 437 communicates to processor 420 when a possible fault condition is detected, such as a "dominant stuck" or "dominant freeze" error on a CAN branch. Processor 420 can then determine which CAN branch is at fault. This can be used in combination with a silent (receive only) mode to diagnose faults. The fault output can aid in diagnostics, along with silence mode and specialized software to determine a fault location. The CAN nodes 425, 430, and 435 can be enabled or disabled as a result of a received fault signal by processor 420 over the silent signal lines 497, 498, and 499, respectively.

Figure 5:
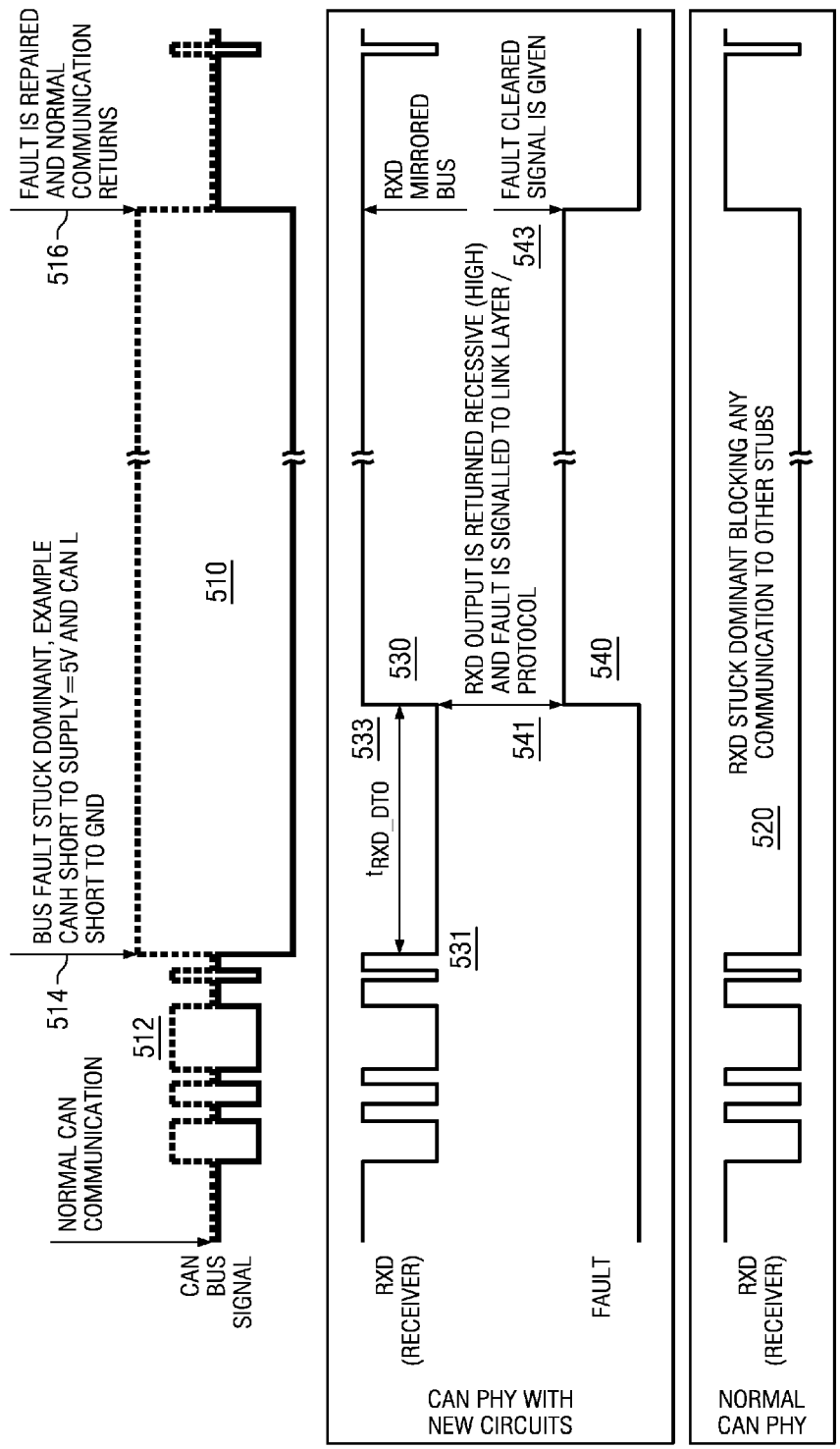
FIG. 5 is an illustration of TXD recessive and dominant signals with and without employment of RXD DTO circuitry.

FIG. 5 illustrates an exemplary CAN bus signal 510, a standard RXD signal 520 as generated by a prior art CAN node, an RXD signal 530 such as generated by the system 400, and a fault signal 540 such as generated by the system 400.

As is illustrated, the exemplary CAN bus signal 510, has a normal communication 512, and a CAN bus fault stuck dominant 514. This CAN bus fault condition continues until the fault is repaired at fault repair 516.

In the standard RXD signal 520, as is illustrated, the RXD signal is the logical inverse of the exemplary CAN bus signal 510. In other words, when the exemplary CAN bus signal is recessive, the RXD is logical high (recessive). When the exemplary CAN bus signal is dominant, the RXD signal is logical low (dominant).

However, typically, all the time that a CAN node is outputting an RXD in a dominant state, the processor is disabled from arbitrating any node on its network. Therefore, the CAN node constructed according to the principles of the present Application, such as CAN node 900 of FIG. 9, which includes an RXD DTO circuit 922 of FIG. 10, to be discussed below, can override an RXD dominant signal, such as an intermediate RXD signal, and instead output a form of an RXD recessive signal, and in some further embodiments, a fault signal.

This can be illustrated in RXD with an RXD DTO circuit signal diagram 530 and a corresponding fault diagram 540. In the diagram 530, a time lapse since a dominant bus signal was first detected, tRXD_DTO, has occurred at an occurrence 531, and therefore RXD signal is also dominant. The RXD output then is returned to recessive at return recessive 533. Then, the CAN node, constructed according to the principles of the present Application including the RXD DTO circuit 922, continues in recessive until the RXD value again then logically mirrors its corresponding CAN bus at fault repair 516.

Figure 9:
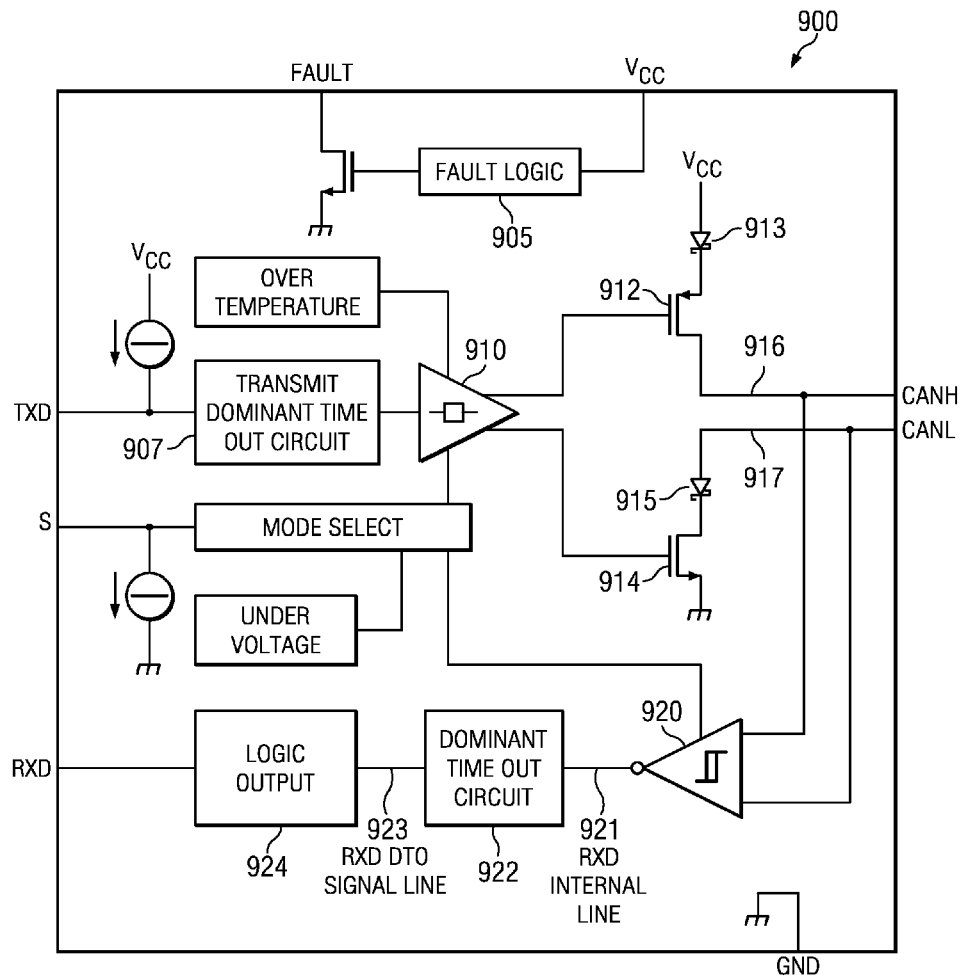
FIG. 9 is an illustration of one embodiment of a CAN node with an RXD DTO circuit in more detail.

In a further embodiment, within the CAN node constructed according to the principles of the present Application, such as CAN node 900 of FIG. 9, a fault 541 is signaled to a link layer and protocol, such as processor 420. Then, a fault repair signal 543 is given for the CAN node during fault repair 516.

Figure 6:
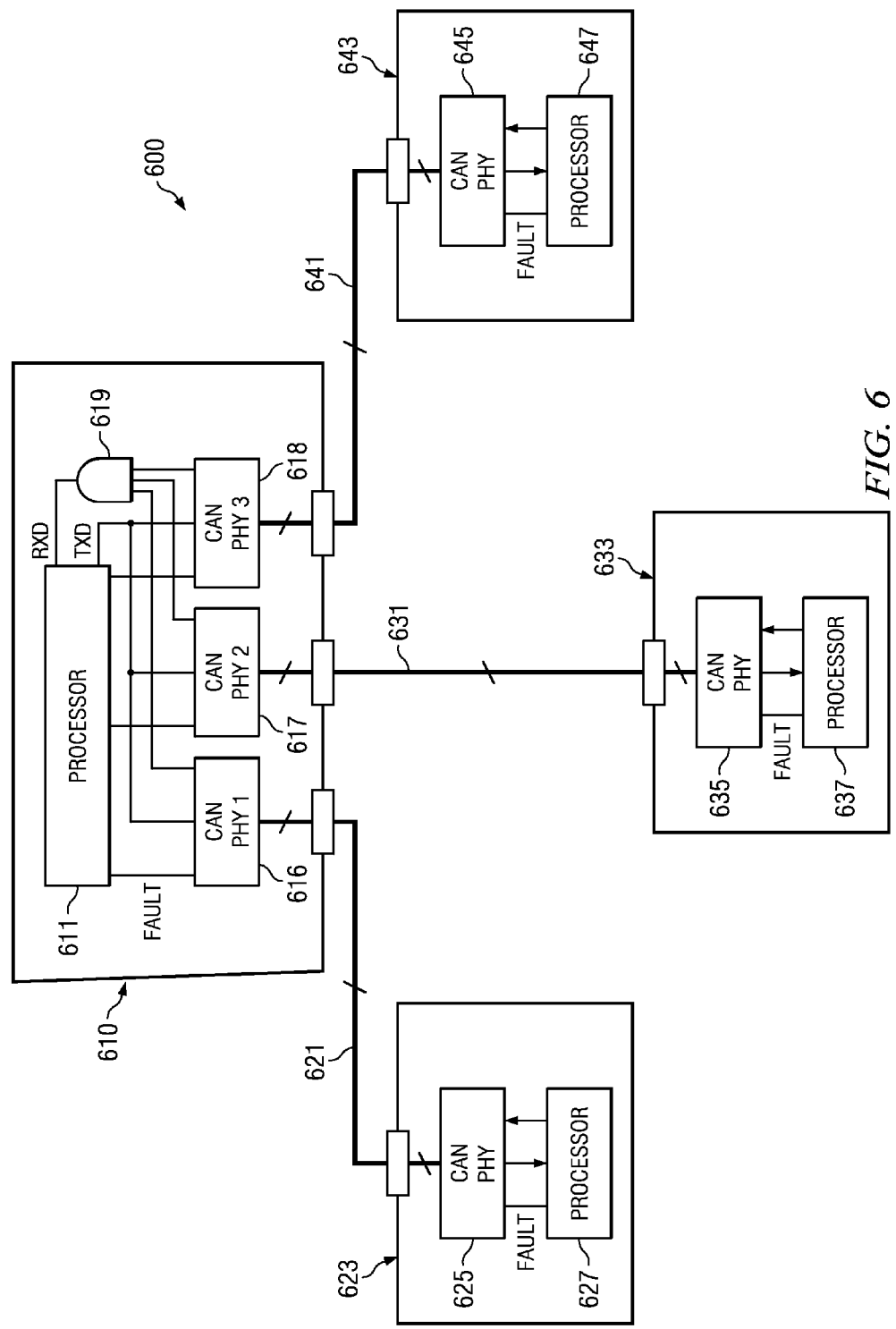
FIG. 6 is an illustration of a star or multi-branch CAN network example of with employment of RXD DTO circuitry.

FIG. 6 illustrates one embodiment of a star or multi-branch network example having branches 621, 631 and 641 that can be of variable length constructed according to the principles of the present Application, such as through employment of an RXD DTO circuit 922.

A master controller 610 includes processor 611 which is in turn coupled through both a common TXD signal line to a first CAN physical layer 616 of star/branch one, a second physical layer 617 of star/branch two, and a third physical layer 618 of star/branch three. In some embodiments, processor 611 is a MCU, DSP, pP or other processor. Each of the physical layers 616-618 output an intermediate RXD signal over an RXD intermediate signal line and are then combined through a logical combiner 619, such as an AND gate, as a combined RXD signal into processor 611 through a combined RXD signal line. Each of the physical layers 616-618 also output their own fault signal to processor 611.

A first star CAN bus line 621 couples the physical layer 616 to a CAN node 623. The CAN node 623 has a physical layer 625 which is coupled to processor 627. The CAN physical layer 625 monitors the first star CAN bus line 621 for a "stuck dominant" error through employment of the RXD DTO circuit 922, and will signal processor 627 via the fault line if one occurs. In a similar fashion, processor 611 will be notified of an error on the first star CAN bus line 621 via its physical layer 616. Both physical layers 616 and 625 will also transition ("override") its own RXD signal to recessive. The physical layer 625 is driven by the TXD line from processor 627 as determined by the link layer and CAN protocol based on the bus states received.

A second star CAN bus line 631 couples the physical layer 617 to a CAN node 633. The CAN node 633 has a physical layer 635 which is coupled to processor 637. The CAN physical layer 635 monitors the second star CAN bus line 631 for a "stuck dominant" error through employment of the RXD DTO circuit 922, and will signal processor 637 via the fault line if one occurs. In a similar fashion, processor 611 will be notified of an error on the second star CAN bus line 631 via its physical layer 617. Both physical layers 617 and 635 will also "override" its RXD signal to recessive. The physical layer 635 is driven by the TXD line from processor 637 as determined by the link layer and CAN protocol based on the bus states received.

A third star CAN bus line 641 couples the physical layer 618 to a CAN node 643. The CAN node 643 has a physical layer 645 which is coupled to processor 647. The CAN physical layer 645 monitors the third star CAN bus line 641 for a "stuck dominant" error through employment of the RXD DTO circuit 922, and will notify processor 647 via the fault line if one occurs. Processor 611 will be notified of an error via its physical layer 618. Both physical layers 618 and 645 will also "override" its RXD signal to recessive. The physical layer 645 is driven by the TXD line from processor 647 as determined by the link layer and CAN protocol based on the bus states received. In the system 600, therefore, each branch of the star is now a properly terminated transmission line, whereas in the above-cited prior art the branches were all tied together and resistors used in a 'trial and error' manner it to try and get the prior art to work through the signal integrity issues created by non-properly terminated transmission lines.

Figure 7:
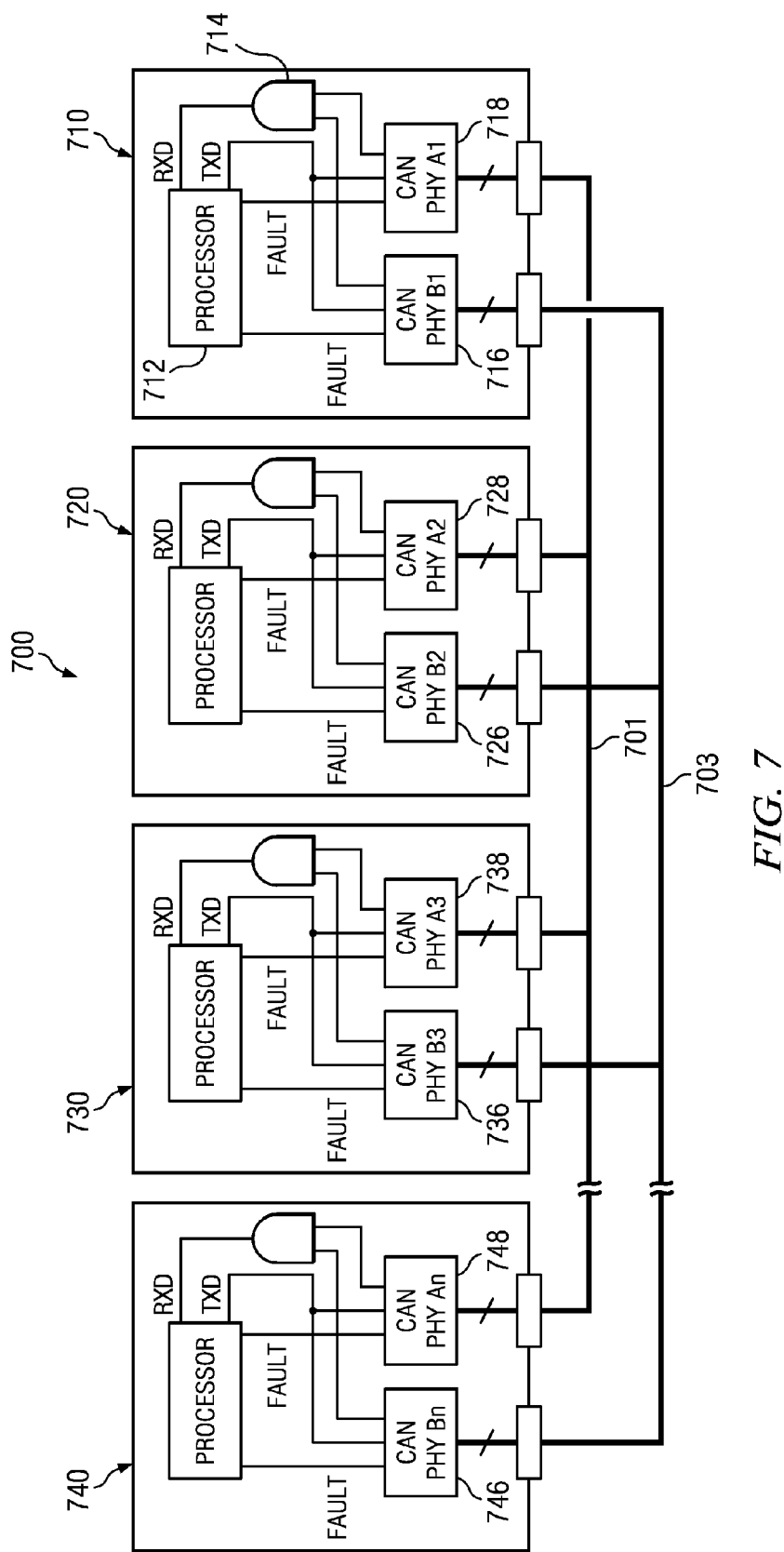
FIG. 7 is an illustration of one embodiment of redundant CAN network that employs CAN nodes, including RXD dominant time out circuitry.

FIG. 7 illustrates one embodiment of a redundant CAN network 700 that employs a plurality of CAN nodes, which in turn include RXD DTO 922 circuitry, constructed according to the principles of the present Application, such as the RXD DTO circuit 922.

A first CAN bus 701 is coupled to a first physical layer 718 of a first CAN node 710, a third physical layer 728 of the second CAN node 720, a fifth physical layer 738 of the third CAN node 730, and a seventh physical layer 748 of a CAN node 740. A second, redundant, CAN bus 703 is coupled to a second physical layer 716 of the first CAN node 710, a fourth physical layer 726 of the second CAN node 720, a sixth physical layer 736 of the third CAN node 730, and an eighth physical layer 746 of the fourth CAN node 740.

The first CAN node 710 includes processor 712, which can be a MCU, DSP, pP or other processor. Processor 712 is in turn coupled through both a common TXD signal line to the first and second physical layer 716, 718. Each of the physical layers 716, 718 output an RXD intermediate signal and are coupled through a logical combiner 714, such as an AND gate, into an RXD signal line into processor 712. Each of the physical layers 716, 718 also output their own fault signal to processor 712 through their own respective fault signal line.

The CAN physical layer 716 and the CAN physical layer 718 each contain the RXD DTO circuit 922, which times out an RXD dominant signal to an RXD recessive after a certain time period has elapsed. Thus if one of the two redundant CAN bus lines 701 and 703 becomes blocked, the RXD DTO circuit 922 of the corresponding physical layers will "override" it to recessive, thereby avoiding a blocking of the output from the logical combiner 714. Thus the data on the redundant bus line that is not "stuck dominant" will be received correctly by processor 712. Processor 712 will also be signaled by the physical layer with the fault through its fault output. The second, third and fourth CAN nodes 720-740 are similarly configured.

In this example, the CAN nodes with termination are first physical layer 718, second physical layer 716, seventh physical layer 748, and the eight physical layer 746. The value of the termination resistance on each end of a cable in the system 700 is configured to be substantially the same as the characteristic impedance of the cable being used. In the system 700, the value of the RXD time out is based on a minimum data rate and a longest string of 0's allowed by a software protocol of the system 700.

In the system 700, an RXD DTO circuit, such as the RXD DTO circuit 922, allows for a parallel structure of a CAN bus. Termination resistance typically are on the end of the CAN bus/transmission line. Therefore, as the system 700 is employing a parallel structure, an advantageous important feature is that the system 700 does not need two CAN controllers/link layers in the processor for the parallelism, such as may have been employed in parallel CAN networks of the prior art, but instead, in the system 700, parallelism can be achieved with the logical combiner (AND) and the RXD DTO. Use of the logical combiner and the RXD DTO can prevent a fault on one CAN bus 701 from blocking the whole network since redundant CAN bus 703 is functional.

Generally, the CAN network 700 allows for redundancy, a redundancy of CAN bus lines without requiring the need for redundancy in the link layer CAN controllers. An RXD DTO circuit 922, prevents any single CAN bus line, such as CAN bus line 701, from blocking other redundancy signals via the logical combiner logic 714 on the RXD signal line. The CAN physical layers 716-748 signal a fault via its fault signal line so that its processor can determine which bus line is in "stuck dominant," and a system warning can be given. After a system warning is given as a result of a received fault, such as a "stuck dominant" error, the bus line with a fault can then be repaired with the aid of the fault lines from each physical layer. Once the bus with the error is repaired the system 700 again has redundant bus lines.

In a further embodiment, other network faults on a given branch, such as CAN network bus 701, which can appear as a recessive and not block the CAN network 700 may be detected by using diagnostic routines and the "silent" mode such as of the physical layers 716, 718, and so on to prevent transmission on one or the other CAN bus 701, 703. A combination of the RXD DTO circuit 922 and diagnostic routines for recessive errors allows for robust fault coverage and detection of issues with a faulty branch so it may be repaired and once again provide redundancy.

Figure 8:
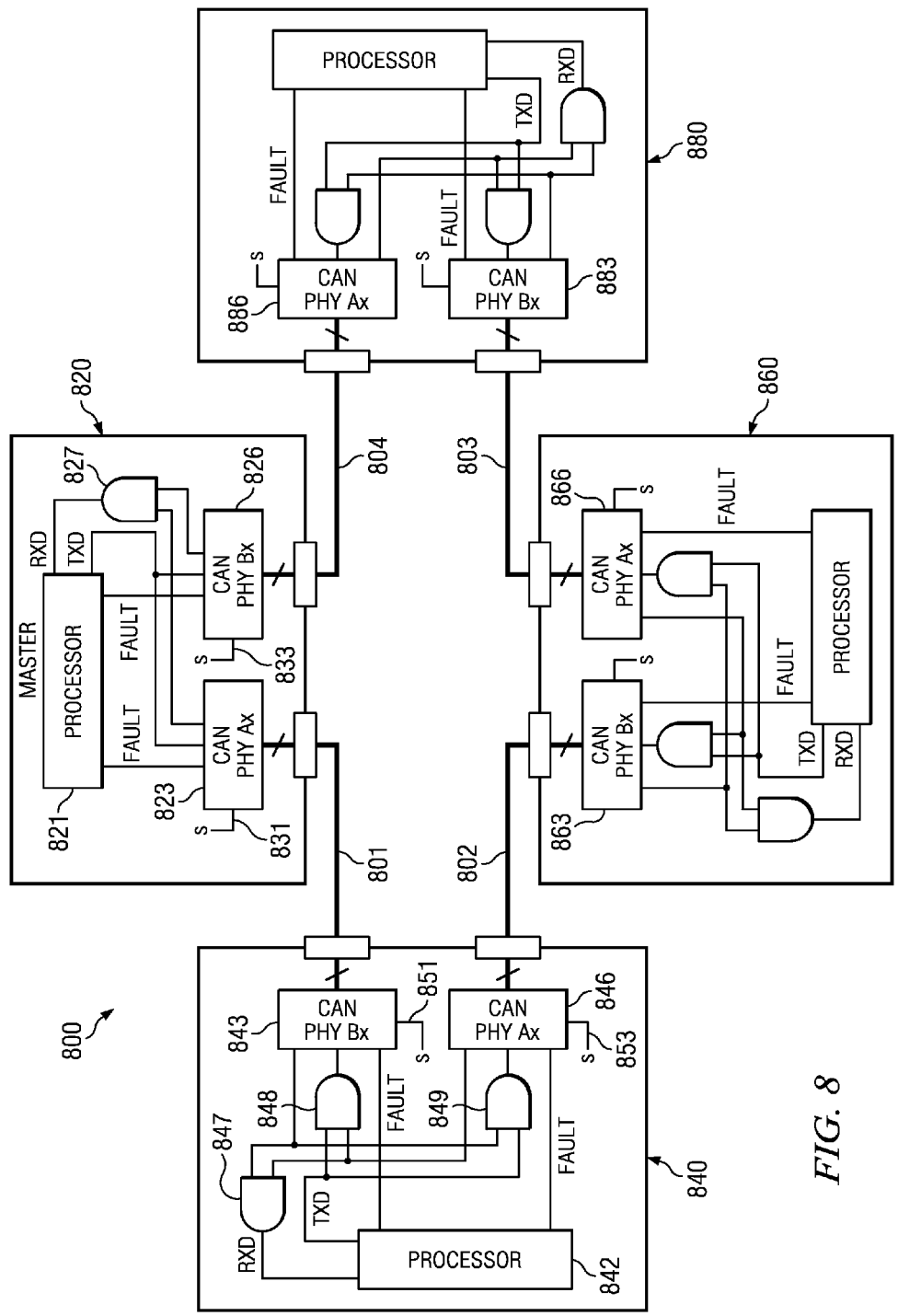
FIG. 8 is an illustration of one embodiment of a CAN ring network that employs RXD DTO circuitry.

FIG. 8 illustrates a CAN ring node network 800 that employs RXD DTO circuitry, such as the RXD DTO circuit 922. A first physical layer 823 of a master CAN node 820 is coupled by a CAN bus 801 to a third physical layer 843 of a CAN node 840. A fourth physical layer 846 of the CAN node 840 is coupled by a CAN bus 802 to a fifth physical layer 863 of a CAN node 860. A sixth physical layer 866 of the CAN 860 is coupled via a CAN bus 803 to a seventh physical layer 883 of a CAN node 880. An eighth physical layer 886 of the CAN node 880 is coupled via a CAN bus 804 to a second physical layer 826 of the master CAN node 820. The master CAN node 820, the CAN node 840, the CAN node 860, and the CAN node 880 each employ RXD DTO circuitry, such as the RXD DTO circuit 922.

The CAN master controller node 820 includes processor 821 which is in turn coupled through both a common TXD signal line to the first physical layer 823 and the second physical layer 826. In some embodiments, processor 821 is a MCU, DSP, pP or some other form of processor. Each of the physical layers 823, 826 outputs an RXD intermediate signal over an RXD intermediate signal line and are combined through a coupled logical combiner 827, such as an AND gate, into an RXD signal into processor 821. Each of the physical layers 823, 826 also output their own fault signal to processor 821 over their own respective fault signal lines. The first CAN physical layer 823 and the second CAN physical layer 826 each contain an RXD DTO circuit, such as RXD DTO circuit 922, which times out an RXD dominant signal, such as an intermediate RXD dominant signal, to an RXD recessive signal after a selected time-lapse of a last transition to a dominant state of a CAN bus line, thereby avoiding a blocking of the CAN bus line.

The silent ("S") signal lines 831, 833, 851, 853 are unique for each physical layer within a CAN node, such as for the CAN physical layer 823 and CAN physical layer 826. The various physical layers 823, 826, 843, and 846 can each be enabled or disabled by a signal received over signal lines 831, 833, 851, and 853, respectively. The enablement signal can be from its own processor, and is derived from control software with respect to the initial direction of the ring and diagnostic routines which may include actions initiated from a fault signal.

The CAN node 840 includes processor 842. In some embodiments, processor 842 is a MCU, DSP, microprocessor or other processor. Each of the physical layers 843-846 output an RXD intermediate signal over its own RXD intermediate signal line and are coupled through a logical combiner 847, such as an AND gate, into an RXD combined signal line coupled into processor 842. Each of the physical layers 843, 846 also output their own fault signal to processor 842. The CAN physical layer 843 and the CAN physical layer 846 each contain an RXD DTO circuit, one exemplary embodiment is RXD DTO circuit 922, which "times out" an RXD dominant signal to an RXD recessive, thereby avoiding a blocking of a CAN bus line.

Processor 842 also has a TXD line, a common TXD line. The TXD line is coupled into an input of a first driver logical combiner 848 and an input of a second driver logical combiner 849. The first and second driver logical combiners 848, 849 can be AND gates. An output of the first logical combiner 848 is coupled to the TXD input of the third physical layer 843, and an output of the second driver logical combiner 849 is coupled to the TXD input of the fourth physical layer 846. The RXD line of the third physical layer 843 is also coupled into an input of the second driver logical combiner 849, and the RXD line of the fourth physical layer 846 is also coupled into an input of the first driver logical combiner 848.

The CAN physical layer 843 and the CAN physical layer 846 each contain an RXD DTO circuit, such as the RXD DTO circuit 922, which can time out an RXD dominant signal to an RXD recessive, thereby avoiding a blocking of a CAN bus line. CAN nodes 860, 880 are analogously configured to CAN node 840. The fault line and S line of the third physical layer 843 and the fourth physical layer 846 are independently routed as separate lines to processor 842 for fault monitoring and physical layer mode control.

In the CAN node 840, each CAN bus line 801, 802 is monitored for a faulty "stuck dominant" by its respective RXD DTO circuit, such as the RXD DTO circuit 922, illustrated in FIG. 9. If a "stuck dominant" fault is detected on the CAN bus line 801 or 802, the RXD DTO circuit 922 will detect the fault and set the RXD output of that physical layer to recessive preventing further system blocking from passing through the logical combiner. The fault is indicated to processor 842 by the fault line. The physical layer will assert a logic high on the fault output which is connected to processor 842. Processor 842 can begin diagnostic and fault recovery actions upon this signal.

In one embodiment, for clockwise movement of messages from the master CAN node 820 back to the master CAN node 820, silent (S) pins of the silent signal lines 831, 833 and so on, of the physical layer 826, physical layer 883, physical layer 863, and physical layer 843 are set to low (transmit enabled), and the other physical layers have their silent (S) (i.e., the silent line) pin set high (transmit disabled). For counter-clockwise movement of messages from the master CAN node 820 back to the master CAN node 820, silent (S) pins of the physical layer 823, physical layer 846, physical layer 866, and physical layer 886 are set to low (transmit enabled) and the other physical layers have their silent (S) pin set high (transmit disabled). All CAN physical layers are now connected in a point to point fashion creating terminated bus segments between each physical layer.

In one embodiment, if a CAN bus fault occurs, a special diagnostic mode can be entered and the master node 820 can send commands out one direction to each CAN node 840-880, and the nodes change the bus direction to send a response back. A last successful CAN node 840-880 reached identifies the section of the ring network 800 where a problem is locate, thus allowing further system diagnosis.

Generally, in the system 800, the RXD DTO circuit which can be embodied in each CAN node 820-880, such at the RXD DTO circuit 922, prevents a single branch stuck dominant blocking the rest of the network in that direction via the driver combiner logics 848, 849, which can be AND gates, on the RXD lines. In one embodiment, the CAN node 840-880 signals this fault to the master CAN node 820 so the system 800 knows that one of the branches 801-804 is stuck dominant and a system warning can be given to the remaining portion of the ring that is not blocked and have this conveyed back to the master 820. Using the principles of the present disclosure, the ring topology may be implemented without the need for duplicate CAN link layer controllers on the processors.

FIG. 9 illustrates one embodiment of a CAN node 900, including an RXD DTO circuit 922, in more detail. The CAN node 900 can be a transceiver node. Generally, a transmit dominant time out 907 prevents a single node via software or hardware failure from blocking the bus dominant, but it cannot eliminate other fault conditions on the bus where the bus may become stuck dominant, for which the RXD DTO circuit 922, is usefully employable. In the system 900, employing both the transmit dominant time out circuit 907 and RX DTO circuit 922 enables a given physical layer to be fully fault tolerant by timing out an excessively long dominant in both directions. Additionally, since each physical layer is configured in loop back (i.e., each receiver is connected to its own driver output) a timer in the receiver path is designed to be slightly longer than a timer in the transmit path, to prevent race conditions between the two.

A first output of the TXD amplifier 910 is coupled via a gate to a first FET 912 and a second output of the TXD amplifier 910 is coupled via a gate to a second FET 914.

The first FET 912 is coupled via a drain to a schottky diode 913, which is coupled to Vcc. The source of the first FET 912 is coupled to an internal CANH 916. The first FET 912 is coupled via a drain to a cathode of a first schottky diode 913, an anode of which is coupled to Vcc.

The source of the second FET 914 is coupled to a ground. The cathode of a second schottky diode 915 is coupled to a drain of the second FET 914, and an anode of the second schottky diode 915 is coupled to an internal CANL 917.

The internal CANH 916 is further coupled to a first input of an RXD comparator 920, and the internal CANL 917 is coupled to a second input of the RXD comparator 920. The RXD comparator 920 outputs its determination of whether the voltage differential across internal CANH 916 and CANL 917 is dominant or recessive as an intermediate RXD signal. This is conveyed across RXD internal line 921 to the RXD dominant time out (DTO) circuit 922. Generally, as discussed previously, the RXD DTO circuit 922 determines whether an RXD dominant state has occurred for greater than a defined time period, and if so, overwrites the RXD dominant signal with an RXD recessive signal. In either event, this RXD signal is conveyed to logic output 924, which amplifies the RXD signal.

Figure 10:
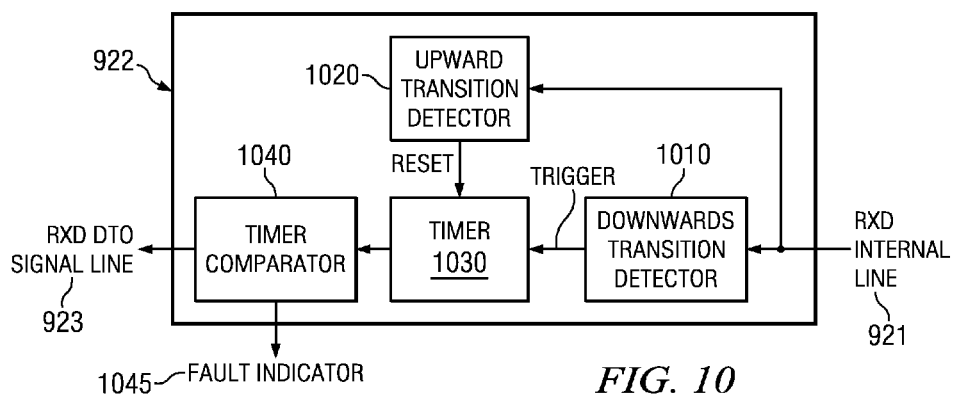
FIG. 10 is an illustration of one embodiment of an RXD DTO circuit used in a CAN node of a CAN system variously employable in FIGS. 4-9.

FIG. 10 illustrates one embodiment of the RXD DTO circuit 922 in more detail. In the RXD DTO circuit 922, an RXD dominant transition detector 1010 is employed to detect a downward transition, dominant, of an RXD internal signal from the coupled RXD internal line 921. In the RXD DTO circuit 922, an RXD recessive transition detector 1020 is employed to detect a recessive transition, which can be an upwards transition, of an RXD signal, such as an RXD intermediate signal. A downward transition corresponds to the RXD internal signal becoming dominant.

When the RXD dominant transition detector 1010 detects the dominant transition, this triggers a timer 1030, and the timer 1030 begins to measure the elapsed time since the trigger occurred. If the RXD recessive transition detector 1020 detects a recessive, or upwards, transition, it "resets" or clears the timer 1030 back to zero.

A measured time interval, measured by the timer 1030 since a last dominant transition, is conveyed to an input of the timer comparator 1040. The time comparator compares the measured time to both a value of zero, and a selected threshold value greater than zero. These thresholds can be a minimum of 1175 us which allows data rates down to 10 kpbs in the CAN protocol. If this time is shortened the minimum data rate increases, if it is lengthened the minimum data rate is lowered. In one example, the minimum data rate for CANopen™ is kbps and the maximum number of consecutive dominant bits allowed is 11. Therefore, a timeout is greater than 1.1 ms in order to allow for normal operation. To account for process variation and variation due to supply voltage and temperature, the typical value is approximately 2.2 milliseconds.

If the measured time interval is equal to zero, then the timer comparator 1040 outputs an RXD DTO recessive signal, and therefore an intermediate RXD signal is also recessive, as the timer 1030 has been reset by the recessive transition detector 1020, and has not since been re-triggered.

If the timer comparator 1040 measures a value between zero and the threshold value, an RXD dominant internal signal is generated as an RXD DTO signal and conveyed across RXD DTO signal line 923 to logic output 924, where it can be output as an RXD intermediate signal, as the RXD intermediate signal is derived from the RXD DTO signal.

However, if the timer comparator 1040 determines that the measured time is equal to or greater than the selected threshold value, then the timer comparator again outputs an RXD DTO internal signal as an override. This RXD DTO recessive signal is generated because, after the measured time interval, a bus "stuck dominant" error is deemed to have occurred. In a further embodiment, the timer comparator 1040 sends a fault indication over a fault line 1045 if the measured time is equal to or greater than the selected threshold value.

Please note that the RXD DTO circuit 922 can be implemented in hardware, software, firmware, or a combination of hardware and software. Those skilled in the art to which this application relates will appreciate that other and further additions, deletions, substitutions and modifications may be made to the described embodiments.

What is claimed is:

1. A controller area network (CAN) node suitable for use in a redundant CAN network topology, comprising:
    redundant CAN PHY A and CAN PHY B physical layer circuits configured for interface to respective redundant differential CAN buses;
    the CAN PHY A and B circuits each including a transmitter dominant circuit (TXD) and a receiver dominant circuit (RXD);
        the TXD circuit configured transmit over a respective redundant CAN bus a TXD data signal as a corresponding TXD dominant signal with differential CAN dominant/recessive states;
        the RXD circuit configured to monitor a respective redundant CAN bus, and generate an internal RXD signal corresponding to dominant and recessive states of the monitor CAN bus; and
    each RXD circuit further including an RXD dominant time out (DTO) circuit configured to monitor the internal RXD signal, and detect a DTO stuck-dominant condition if the internal RXD signal is in a dominant state for greater than a pre-defined DTO stuck-dominant timeout period;
    each RXD circuit further configured to
        if a DTO stuck-dominant condition is not detected, generate an intermediate RXD signal corresponding to the internal RXD signal, including dominant and recessive states;
        if a DTO stuck-dominant condition is detected, generate an intermediate RXD signal in a recessive state;
    a logic combiner circuit configured to logically combine respective intermediate RXD signals from respective CAN PHY A and CAN PHY B circuits, and generate a resulting RXD signal;
    a controller configured to
        provide to respective TXD circuits in respective CAN PHY A and B circuits, the TXD Data signal, and
        receive from the logical combiner circuit, the logically combined RXD signal, such that, if a DTO stuck-dominant condition is detected by one of the RXD circuits, the controller receives the RXD signal corresponding to the intermediate RXD signal from the other RXD circuit.

2. The CAN node of claim 1:
wherein each TXD circuit comprises a transmit dominant (TXD) amplifier configured to drive CANH and CANL differential bus lines of the CAN bus, and
wherein the TXD amplifier is driven by the TXD signal.

3. The CAN node of claim 1, wherein
the RXD circuit is configured to generate, in response to detection of a DTO stuck-dominant condition, respective DTO stuck-dominant fault A and DTO stuck-dominant fault B signals; and
the controller is configured to receive from respective RXD circuits in respective CAN PHY A and B circuits, the respective DTO stuck-dominant fault A and fault B signals, enabling the controller to determine when a respective redundant CAN bus is in a DTO stuck-dominant condition.

4. The CAN node of claim 1, wherein the RXD dominant time out (DTO) circuit comprises:
an RXD dominant transition detector coupled to an output of the RXD comparator;
a timer that is triggered by the RXD dominant transition detector detecting a dominant RXD transition;
an RXD dominant timer comparator, coupled to an output of the timer, that compares an output of the timer to a selected value, wherein an internal RXD dominant signal is changed to an RXD DTO recessive signal after a selected time interval has lapsed as measured by the RXD dominant timer comparator; and
an RXD recessive transition detector, wherein the RXD recessive transition detector clears the timer when a recessive transition occurs on an RXD internal signal.

5. The CAN node of claim 1,
wherein the controller is selected from the group consisting of: a MCU with a MCU link layer function; a DSP with a DSP link layer function; a µP with link layer function; and general processor with a link layer function, derived from the combined RXD signal.

6. The CAN node of claim 1, wherein the logical combiner is an AND gate.

7. A system suitable for communication over a controller area network (CAN) between CAN nodes, comprising:
redundant differential CAN buses CAN_A and CAN_B, each with differential high CANH and low CANL bus lines;
multiple CAN nodes coupled to the differential CAN_A and CAN_B buses;
each CAN node including:
redundant CAN PHY A and CAN PHY B physical layer circuits configured for interface to the respective redundant differential CAN_A and CAN_B buses;
the CAN PHY A and B circuits each including a transmitter dominant circuit (TXD) and a receiver dominant circuit (RXD);
the TXD circuit configured transmit over a respective redundant CAN bus a TXD data signal as a corresponding TXD dominant signal with differential CAN dominant/recessive states;
the RXD circuit configured to monitor a respective redundant CAN bus, and generate an internal RXD signal corresponding to dominant and recessive states of the monitored CAN bus; and
each RXD circuit further including an RXD dominant time out (DTO) circuit configured to monitor the internal RXD signal, and detect a DTO stuck-dominant condition if the internal RXD signal is in a dominant state for greater than a pre-defined DTO stuck-dominant time-out period;
each RXD circuit further configured to:
if a DTO stuck-dominant condition is not detected, generate an intermediate RXD signal corresponding to the internal RXD signal, including dominant and recessive states; or
if a DTO stuck-dominant condition is detected, generate an intermediate RXD signal in a recessive state;
a logic combiner circuit configured to logically combine respective intermediate RXD signals from respective CAN PHY A and CAN PHY B circuits, and generate a resulting RXD signal;
a controller configured to
provide to respective TXD circuits in respective CAN PHY A and B circuits, the TXD Data signal, and
receive from the logical combiner circuit, the logically combined RXD signal, such that, if a DTO stuck-dominant condition is detected by one of the RXD circuits, the RXD signal received by the controller corresponds to the intermediate RXD signal from the other RXD circuit.

8. The system of claim 7:
wherein each TXD circuit comprises a transmit dominant (TXD) amplifier configured to drive CANH and CANL differential bus lines of the CAN bus, and
wherein the TXD amplifier is driven by the TXD signal.

9. The system of claim 7, wherein
the RXD circuit is configured to generate, in response to detection of a DTO stuck-dominant condition, respective DTO stuck-dominant fault_A and DTO stuck-dominant fault_B signals; and
the controller is configured to receive from respective RXD circuits in respective CAN PHY A and B circuits, the respective DTO stuck-dominant fault_A and fault_B signals, enabling the controller to determine when a respective redundant CAN bus is in a DTO stuck-dominant condition.

10. The system of claim 7, wherein the RXD dominant time out (DTO) circuit comprises:
an RXD dominant transition detector coupled to an output of the RXD comparator;
a timer that is triggered by the RXD dominant transition detector detecting a dominant RXD transition;
an RXD dominant timer comparator, coupled to an output of the timer, that compares an output of the timer to a selected value, wherein an internal RXD dominant signal is changed to an RXD DTO recessive signal after a selected time interval has lapsed as measured by the RXD dominant timer comparator; and
an RXD recessive transition detector, wherein the RXD recessive transition detector clears the timer when a recessive transition occurs on an RXD internal signal.

11. The system of claim 7,
wherein the controller is selected from the group consisting of: a MCU with a MCU link layer function; a DSP with a DSP link layer function; a µP with link layer function; and general processor with a link layer function, derived from the combined RXD signal.

12. The system of claim 7, wherein the logical combiner is an AND gate.

* * * * *